United States Patent [19]

Hendricks

[11] Patent Number: 5,012,167
[45] Date of Patent: Apr. 30, 1991

[54] SINUSOIDAL SIGNAL DECODER FOR 12-STEP MOTOR COMMUTATION

[75] Inventor: Howard F. Hendricks, Harleysville, Pa.

[73] Assignee: Penn Engineering & Manufacturing Corp., Danboro, Pa.

[21] Appl. No.: 488,478

[22] Filed: Mar. 30, 1990

Related U.S. Application Data

[63] Continuation of Ser. No. 116,160, Nov. 3, 1987, abandoned.

[51] Int. Cl.$^5$ ............................................. H02K 29/12
[52] U.S. Cl. .................................... 318/254; 318/138
[58] Field of Search ..................... 318/138, 254, 439

[56] References Cited

U.S. PATENT DOCUMENTS

| | | | |
|---|---|---|---|
| 3,264,539 | 8/1966 | Sander | 318/254 X |
| 3,466,519 | 9/1969 | Platnick | 318/138 |
| 3,621,358 | 11/1971 | Henrichs | 318/486 |
| 3,662,238 | 5/1972 | Kobayashi et al. | 318/254 |
| 4,208,621 | 6/1980 | Hipkins et al. | 318/254 X |
| 4,292,575 | 9/1981 | Kuhnlein et al. | 318/254 |
| 4,356,437 | 10/1982 | Saito et al. | 318/254 |
| 4,442,386 | 4/1984 | Uchida et al. | 318/254 |
| 4,525,657 | 6/1985 | Nakase et al. | 318/254 |
| 4,631,458 | 12/1986 | Furuichi | 318/254 |
| 4,631,459 | 12/1986 | Fujioka et al. | 318/254 |
| 4,758,768 | 7/1988 | Hendricks et al. | 318/254 |

FOREIGN PATENT DOCUMENTS

| | | | |
|---|---|---|---|
| 52-5417 | 1/1977 | Japan | 318/138 |
| 57-40392 | 3/1982 | Japan | 318/254 |
| 62-18989 | 1/1987 | Japan | 318/254 |

*Primary Examiner*—Bentsu Ro
*Attorney, Agent, or Firm*—Gregory J. Gore

[57] ABSTRACT

12-step motor commutation is provided by a three-phase sinusoidal signal generator and related circuitry. Circuitry which compares the voltage outputs of two primary signals provides two additional switching points for every 360 electrical degrees. Three comparator circuits provide six additional switching points. Primary voltage outputs are weighted in the ratio of 2:1 prior to comparison.

6 Claims, 3 Drawing Sheets

SINUSOIDAL SIGNAL DECODER FOR 12-STEP MOTOR COMMUTATION

This is a continuation of application Ser. No. 116,160, filed Nov. 3, 1987, now abandoned.

FIELD OF THE INVENTION

This device relates to brushless DC motors and, in particular, a method of commutation whereby motor shaft angle produces a control signal for permitting digital drive of the motor.

BACKGROUND OF THE INVENTION

Problems with the existing art in brushless DC motors include an inherent torque reduction at the time of commutation, friction and magnetic cogging which acting together are referred to as "torque ripple". Most commonly, a three-phase brushless DC motor utilizes only six commutation points per 360 electrical degrees and is driven by three signaling devices, such as hall sensors.

One solution to the problem of torque ripple has been the use of sinusoidal current drive systems. However, these are extremely expensive and require a high accuracy shaft angle detector physically built into the motor structure followed by a large amount of accompanying electronic circuitry.

It is known to utilize 12-step commutation in a three-phase stepper motor to achieve twelve torque-producing steps within each 360 electrical degrees U S. Pat. No. 3,621,358 to Hinrichs et al, which is hereby incorporated by reference, discloses such a wiring circuit which is driven by a clock pulse generator connected to a shift register and logic gates producing a stepper motor with twelve steps per every 360 electrical degrees.

SUMMARY OF THE INVENTION

Heretofore, commutating twelve steps within every 360 electrical degrees in a brushless motor with shaft-mounted commutation is difficult to achieve economically. As further disclosed, a standard three-phase sinusoidal device for producing commutation signals can be employed with the circuitry disclosed in order to produce the desired twelve commutation steps as described above. In but one embodiment, this is achieved by a permanent magnet rotor and a stator with three-phase field windings in combination with three voltage comparator circuits which detect six additional commutation switching points.

Each voltage comparator circuit compares the voltage output of one pair of sinusoidal outputs, i.e. outputs A and B, B and C, and A and C of outputs A, B, and C. Each comparator circuit yields two additional switch points. These occur twice in each 360 degree electrical cycle when the weighted output voltages are equal. These three comparator circuit outputs are then combined through the method of EXCLUSIVE OR-ing to mix the six additional switch points with the six original switch points in order to arrive at a total of twelve equally spaced commutation steps per every 360 electrical degrees.

DESCRIPTION OF THE PREFERRED EMBODIMENT

Figure 1:
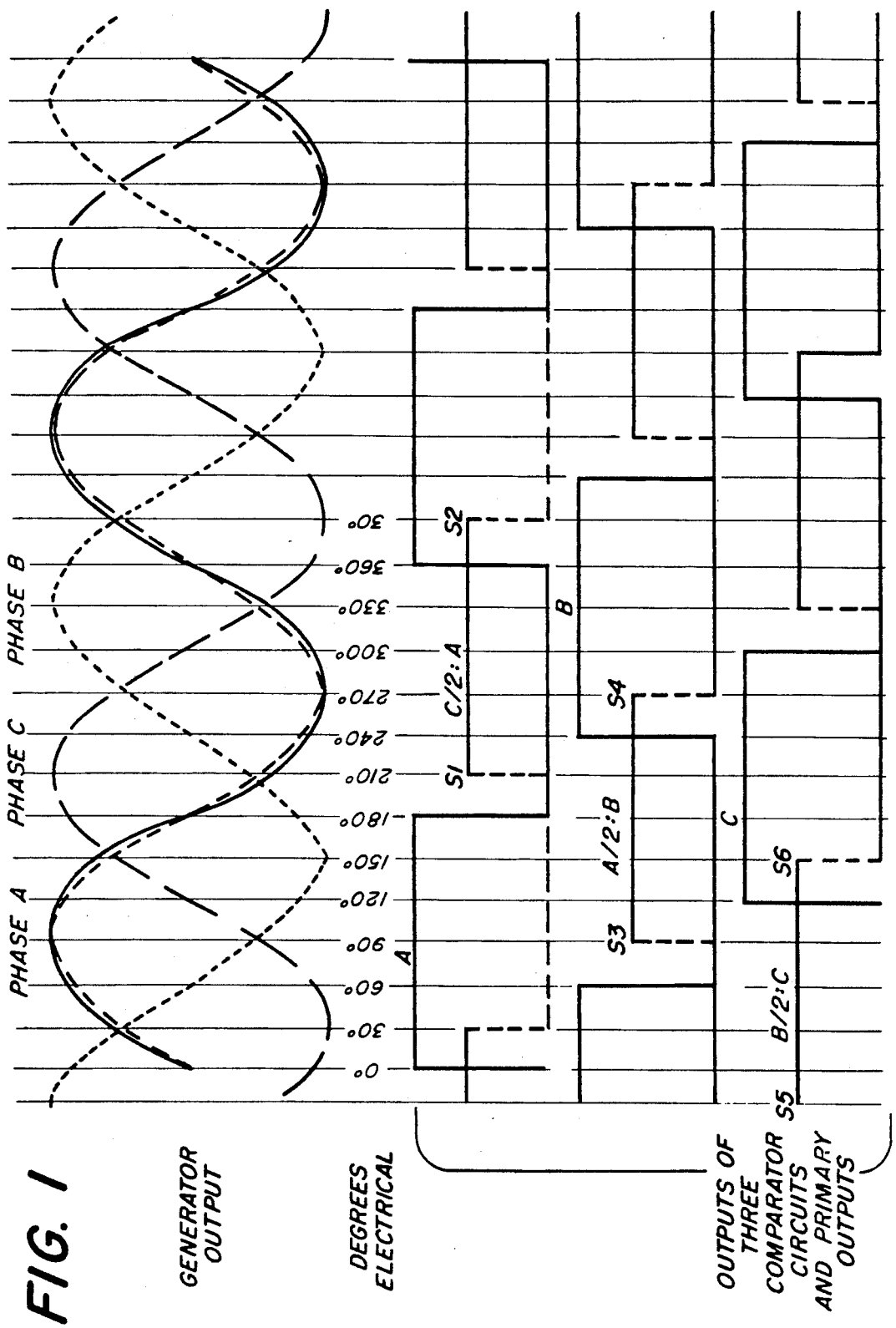
FIG. 1 is a graph showing the sinusoidal outputs of each phase of the commutation device in relationship to the output of the additional signals provided by the voltage comparator circuitry.

Referring now to FIG. 1, the use of three-phase sinusoidal signals for deriving a 6-step brushless drive circuit is well-known Such a signal may be generated from a commercially available device such as the Tachsyn(R) produced by Servo-tek Products Company of Hawthorne, NJ, which is mounted on the motor shaft. As shown in FIG. 1, this system will produce three signals A, B and C, which will be 60 degrees electrical leading or lagging each other.

It has been found that the requirement for detecting a 30-degree electrical switching point can be achieved without adding any more physical detectors to the motor. Analysis of the voltage plots from FIG. 1 reveals that the additional detection points desired occur when one of the phases is either at a negative or positive maximum condition. It can also be seen from FIG. 1 that at the desired additional switching points S1–S6, the other two phases are of a value equal to one-half that of the maximum primary phase and are opposite in sign.

Figure 2A:
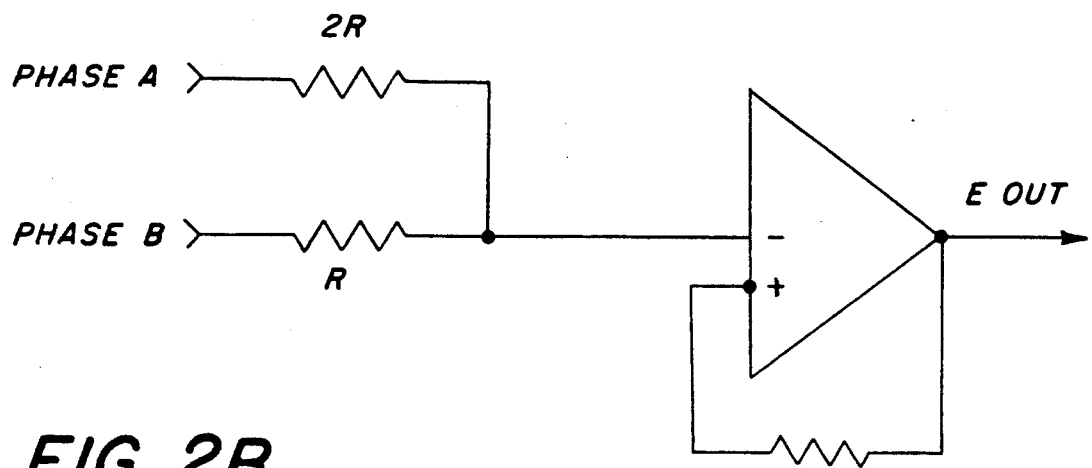
FIGS. 2a, 2b, and 2c are diagrams showing the voltage comparator circuitry.

Three voltage comparitors are used to generate the desired three additional signals to compare the voltages of the phases according to these relations as follows. If the signals are fed into a voltage comparator with 2:1 proportional weighting resistors in the input circuit, as shown in FIG. 2a, reliable detector action will occur. The weighting provided by the circuit shown in FIG. 2a favors phase B over phase A. The following chart shows the output voltage state for given various angles measured in electrical degrees from this circuit.

| Electrical Angle (Degrees) | Phase A Voltage | Phase B Voltage | Output Voltage State |
|---|---|---|---|
| 0 | 0 | +.866 max. | 0 |
| 30 | +.5 max. | +.5 max. | 0 |
| 60 | +.866 max. | 0 | 0 |
| 90 | 1 max. | −.5 max. | 1 |
| 120 | +.866 max. | −.866 max. | 1 |
| 150 | +.5 max. | −1 | 1 |
| 180 | 0 | −.866 max. | 1 |
| 210 | −.5 max. | −.5 max. | 1 |
| 240 | −.866 max | 0 | 1 |
| 270 | −1 max. | +.5 max. | 0 |
| 300 | −.866 max. | +.866 max. | 0 |
| 330 | −.5 max. | +1 max. | 0 |

The switch points for this network occur at 90 degrees and 270 degrees because of the action of the weighting resistors. The resultant current follows the phase B current.

Figure 2B:
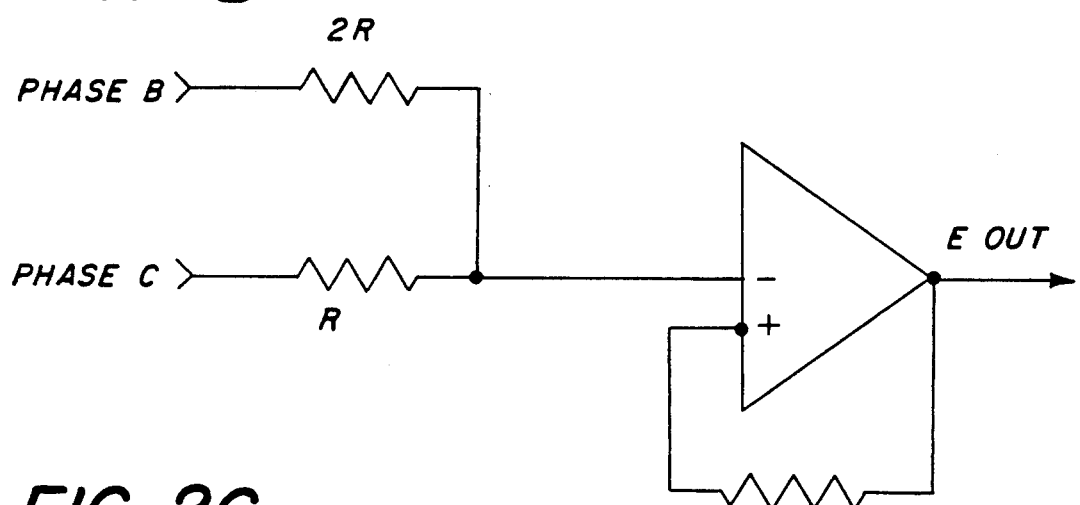
Figure 2C:
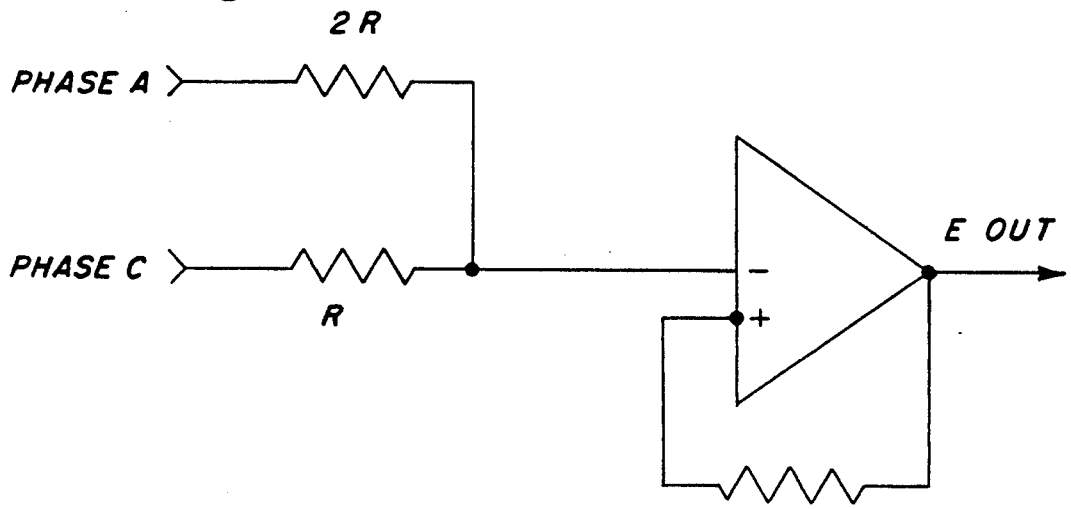

A second circuit is shown in FIG. 2b. The weighting favors phase C and the current with respect to phase B. Referring to FIG. 1, it will be understood that the switch points in the second circuit will occur at 150 degrees and 330 degrees. In a third circuit shown in FIG. 2c, phase A and phase C are similarly compared providing switch points at 30 degrees and 210 degrees. These three circuits provide the correct condition for the mixing action of the EXCLUSIVE-OR circuit and, hence, the six extra commutations steps from the three-phase sinusoidal signals can be derived.

FIG. 1 includes a squared voltage output plot for each of the voltage comparator circuits described above. Combining the three resultant outputs from these circuits with each of the three primary outputs from the sinusoidal signal generator, all which have been squared, yields the required switching points every 30 degrees.

Figure 3:
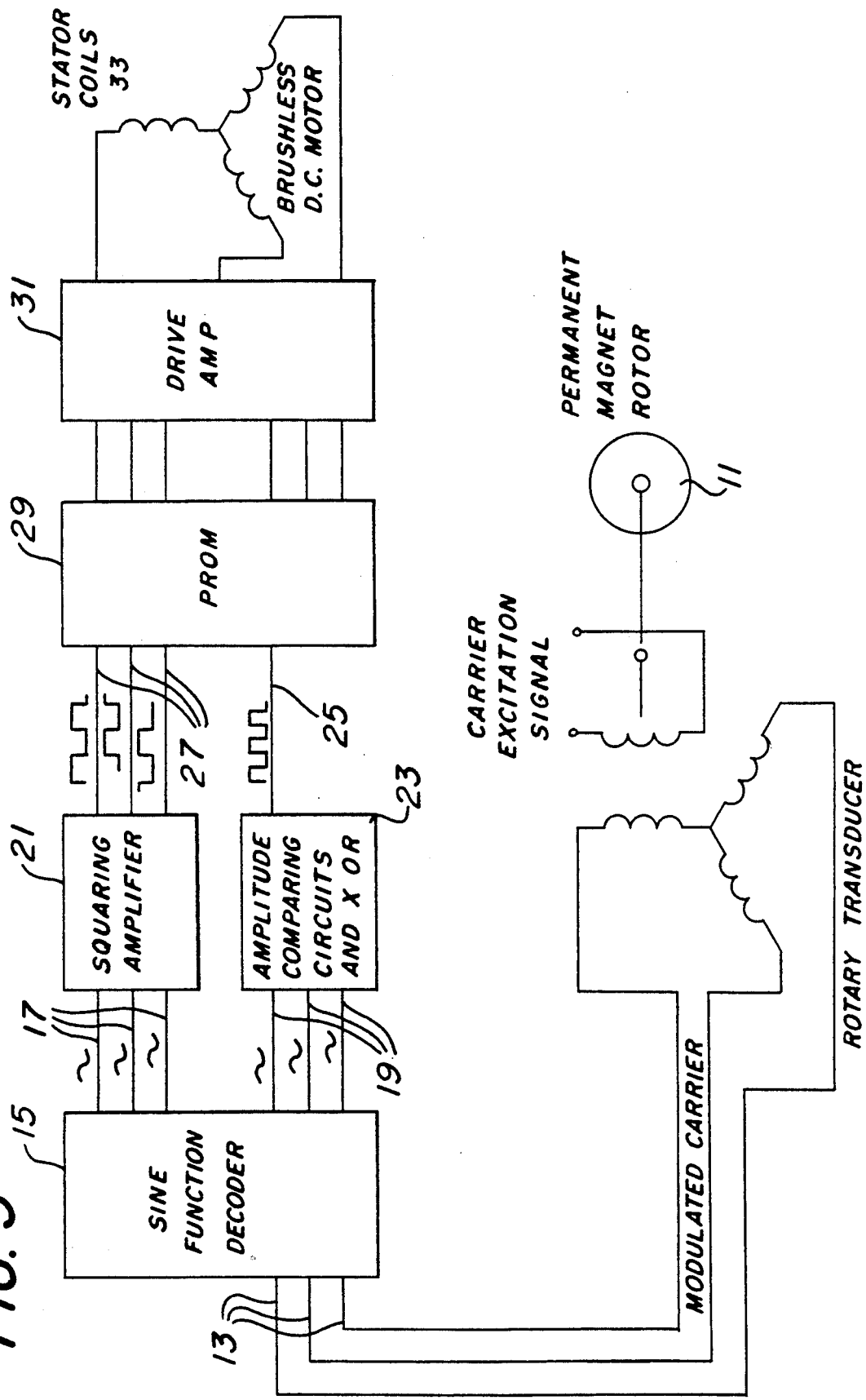
FIG. 3 is a diagram showing the signal generating and processing components of the present invention.

Referring now to FIG. 3, the various signal generating and motor components are shown diagrammatically. The permanent magnet rotor 11 produces a three-phase output signal 13 which, after sine function decoding by circuitry 15, produces three primary sine function voltage outputs 17. As shown in this diagram, two identical sets of primary output voltages 17 and 19 are produced in parallel. A first set 17 is supplied to a squaring amplifier 21 which, when combined, produces six detectable switching points every 60 degrees. These outputs are shown in more detail in FIG. 1 as primary outputs A, B and C. A second group of primary output signals 19 are fed to the amplitude comparing circuits 23 and EXCLUSIVE-OR circuit indicated in the diagram of FIG. 3 labeled as "amplitude comparing circuits and X OR" which are more completely described in FIGS. 2a, 2b and 2c. These circuits produce three secondary signals 25 which are then squared and mixed to provide six additional detectable switch points 30 degrees out of phase with the switch points provided by squaring the three primary output voltages. FIG. 1 clearly shows the phase relationship between the secondary and primary output signals and their respective phase relationship.

As further shown in FIG. 3, the three squared primary output signals 27 are delivered to the PROM 29 with the mixed secondary output signals 25. The PROM 29 then delivers six distinct outputs to the drive amp 31 which excites the stator coils 33 of the brushless DC motor to produce twelve torque angles.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. In an electric motor having a device for decoding sinusoidal signals from a motor shaft generator to derive a 12-step commutation, comprising:
    a. means for generating three sinusoidal output signals connected to the motor shaft, said signals being out of phase 120 electrical degrees and producing an output voltage proportional to the angle of said motor shaft;
    b. three voltage comparator circuits, each connected to receive a pair of said three sinusoidal output signals;
    c. means for combining the outputs of said three voltage comparator circuits with said three sinusoidal output signals to yield six equally spaced and non-overlapping voltage outputs;
    d. a PROM, detecting commutation switch points from said six voltage outputs, for producing twelve torque angles per rotor revolution for said 12-step commutation;
    e. a drive amp signaled by said PROM; and
    f. stator coils energized by said drive amp.

2. The motor of claim 1, wherein said means for generating three sinusoidal output signals comprises a permanent magnet rotor and three-phase field windings.

3. The motor of claim 2 further including a 2:1 input weighing resistor network connected to each of said three voltage comparator circuits.

4. The motor of claim 3 wherein said means for combining the outputs of said three voltage comparator circuits with said three sinusoidal outputs signals comprises EXCLUSIVE-OR decoding circuitry.

5. The motor of claim 4 wherein said motor is a brushless DC motor.

6. A method of producing a 12-step commutation switching signal in an electric motor, comprising the steps of:
    a. generating three sinusoidal output signals with a shaft-mounted generator;
    b. combining said three output signals into three pairs;
    c. comparing the value of each pair of the output signals using a 2:1 weighing resistor network to achieve three signals from the comparison of each of the three pairs; and
    d. combining the three sinusoidal output signals with the three signals resulting from said comparison step by the process of EXCLUSIVE-ORing to yield a total of six output signals for said 12-step commutation.

* * * * *